US006578373B1

(12) United States Patent
Barbier

(10) Patent No.: US 6,578,373 B1
(45) Date of Patent: Jun. 17, 2003

(54) RATE OF CHANGE DETECTOR FOR REFRIGERANT FLOODBACK

(76) Inventor: William J. Barbier, 6720 Christina Maria La., Hazelwood, MO (US) 63042

(*) Notice: Subject to any disclaimer, the term of this patent is extended or adjusted under 35 U.S.C. 154(b) by 31 days.

(21) Appl. No.: 09/878,571

(22) Filed: Jun. 11, 2001

Related U.S. Application Data

(60) Provisional application No. 60/234,297, filed on Sep. 21, 2000.

(51) Int. Cl.[7] .......................... G05D 23/32; G05D 15/00
(52) U.S. Cl. .......................... 62/158; 62/227; 236/780; 340/589
(58) Field of Search .......................... 62/227, 126, 129, 62/158; 236/78 D; 340/589, 870, 17

(56) References Cited

U.S. PATENT DOCUMENTS

| 4,788,826 A | * 12/1988 | Higdon .................... 62/212 X |
| 5,209,076 A | 5/1993 | Kauffman |
| 5,311,745 A | 5/1994 | Lockhart |
| 5,539,381 A | * 7/1996 | Johnson .................. 340/589 X |
| 5,627,770 A | 5/1997 | Barbier |
| 5,666,815 A | 9/1997 | Aloise |
| 5,992,163 A | * 11/1999 | Baruschke et al. ........... 62/156 |
| 6,321,543 B1 | * 11/2001 | Said et al. .................... 62/81 |

* cited by examiner

*Primary Examiner*—William Wayner
(74) *Attorney, Agent, or Firm*—Daniel E Kramer

(57) ABSTRACT

A floodback detector for refrigerant systems employing any of: minimum suction temperature, temperature rate of change and duration thereof; minimum superheat, superheat rate of change and duration thereof.

26 Claims, 6 Drawing Sheets

TEMPERATURE CHANGE AND RATE OF TEMPERATURE CHANGE

Sec. A-A

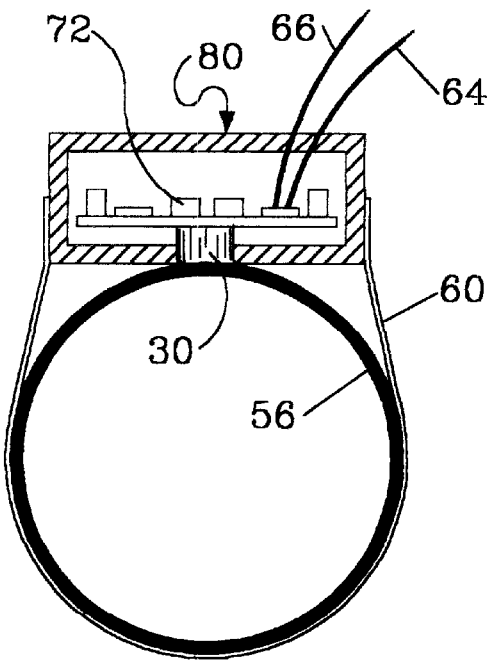
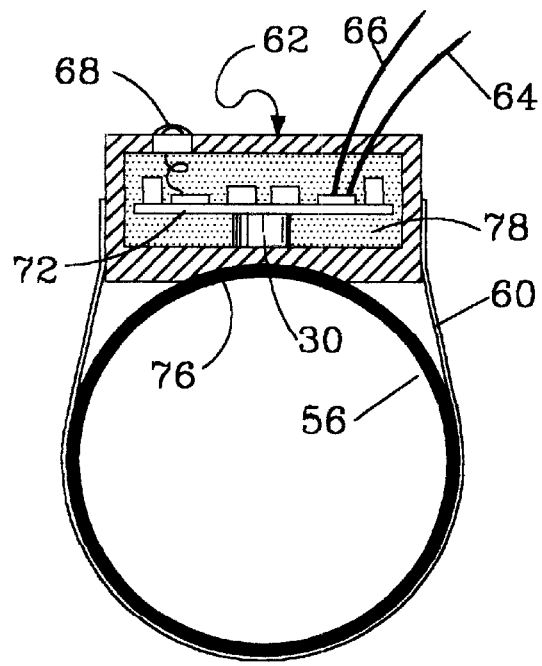
Fig. 3A
Fig 3B
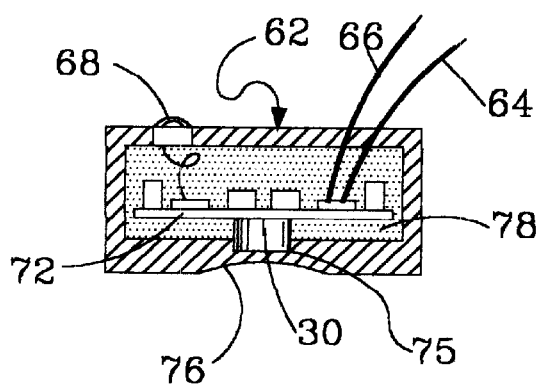
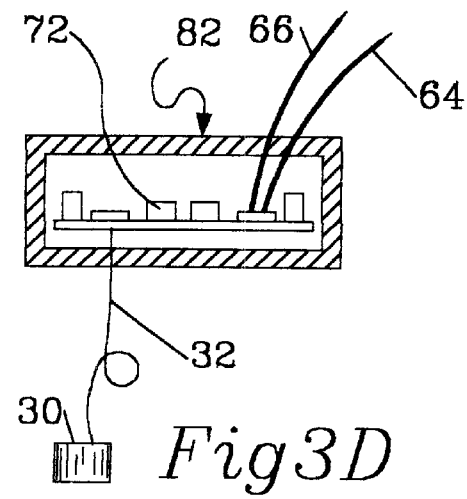
Fig 3C
Fig 3D

RATE OF CHANGE DETECTOR FOR REFRIGERANT FLOODBACK

I hearby claim priority based on a Provisional Patent Application having serial No. 60/234,297 filed Sep. 21 2000.

BACKGROUND

In refrigerating systems, a positive displacement compressor such as a piston type compressor is typically used to compress refrigerant gas from a lower suction pressure value to a much higher discharge pressure. Such compressors include a crankcase as a storage location for the lubricating oil. A suction conduit connects an evaporator or cooling coil to the compressor inlet.

Positive displacement type compressors can easily be damaged should liquid refrigerant rather than vapor refrigerant be drawn either into its crankcase or its compression chamber. The term floodback is employed to denote and describe the condition when liquid refrigerant flows through the suction conduit and enters the crankcase or cylinders of a compressor. "Slugging" is the term used to describe the condition when so much incompressible liquid refrigerant enters the compressor cylinders or other types of compression chambers that audible noise of chattering or hammering occurs. In larger compressors, instantaneous compressor damage or destruction can occur under slugging conditions.

Even if insufficient liquid refrigerant enters the running compressor to cause slugging, compressor damage can occur if the lubricating oil in the crankcase is diluted by liquid refrigerant entering the crankcase or oil sump, thereby reducing its viscosity and lubricity and generating excessive wear of the lubricated parts such as main and connecting rod bearings and cylinder walls and piston rings. While this kind of damage may not be immediately observable, it always leads to shortened compressor life and progressively noisier operation. The debris of excessive wear can circulate around the system with the refrigerant plugging driers and filters and reducing system performance through increased pressure drop through these partially plugged components.

Even with the compressor 'off', migration of gaseous refrigerant to an unusually cold crankcase there, mixing with the oil, can cause both immediate and long term compressor destruction when the compressor starts up or runs under this condition. The dual destructive sequence begins when the compressor starts, sharply reducing the pressure within the crankcase and thereby causing the excessively refrigerant laden lubricant to foam and to be drawn into the compressor cylinders causing immediate slugging. Even if slugging does not occur, the reduced lubricity of the diluted oil promotes excessive wear and early compressor failure.

During compressor operation, the floodback condition of liquid refrigerant flowing to the compressor can be caused by incorrect expansion valve setting or expansion valve or restrictor malfunction or by loss or excessive reduction of evaporator load. Expansion valves are devices that control or restrict refrigerant liquid flow into the evaporator to just the amount or rate of flow that the evaporator can evaporate. Reductions in evaporator load can be caused by plugged filters in the evaporator airstream or frost clogging the evaporator face or failure of the evaporator fan/s to operate.

In the past various controls and piping artifacts have been used to try to ensure that the refrigerant being compressed is always in gaseous form, that is, that no floodback to the compressor occurs. One such refrigerant flow control is a thermostatic expansion valve that senses the superheat condition at the evaporator outlet and adjusts refrigerant flow in response. Piping artifacts employed to help ensure that only gas flows to the compressor include suction accumulators and suction traps; these are vessels that catch and retain liquid refrigerant while allowing refrigerant vapor to continue to flow to the compressor.

Service personnel on the site can detect floodback to the compressor while it occurs by employing rough indicia such as frost formation on the suction line, though this indication must be skillfully used since suction frost can be formed by dry gas (no liquid) that is simply colder than 32 F.

Therefore mechanics developed their own tools for deciding whether there was liquid refrigerant within a suction line. They would grip the bare line and judge how fast their hand chilled. We now know the high heat transfer coefficient between liquid refrigerant and the pipe makes the hand holding the pipe feel cool, and appear to cool, more rapidly than a similar pipe carrying only cold vapor with no liquid refrigerant in it.

Other mechanics would wet their finger tips and touch the pipe, thereby deciding on the presence or absence of liquid in the pipe by whether or not the wet finger froze to the pipe. Other mechanics would listen to the sound of the operating compressor to help them decide whether the compressor was attempting to compress a mixture of refrigerant vapor and liquid or vapor only.

However, even normal systems have a substantial potential for 'noise', that is, 'hunting' or cyclic or random variations in suction line temperature and pressure. These random changes could be caused by normal fluctuations in thermal expansion valves or by sharp load changes generated by momentary fans-off condition or other normal but transient events. Therefore early efforts to utilize suction line temperatures as predictors of floodback were ineffective and it became 'common knowledge' that protective measures based on suction line temperatures were unreliable.

None of these sensing methods was amenable to automatic mechanical or electrical sensing whereby a floodback condition hazardous to the life of the compressor could be observed and the compressor turned off or an alarm signaled.

Superheat measurement at the suction inlet of the compressor can indicate the presence of liquid refrigerant. However, to be effective superheat measurements must be made skillfully and with the proper equipment correctly applied.

Superheat is accurately measured only by measuring the pressure of the suction gas, determining the saturation temperature from a pressure/saturation temperature conversion chart, generally by interpolation, or by evaluation of an equation that simulates the pressure-temperature curve for that refrigerant. Then the calculated saturation temperature is subtracted from the observed suction line temperature, the difference being the superheat.

Among service personnel it is not well known that the commonly used Bourdon pressure gages that compare line pressure with atmospheric pressure are subject to variations from altitude and weather that can affect the expected saturation temperature, especially in freezer systems. Sufficiently accurate pressures can be observed employing 'absolute' pressure detectors. Such pressure detectors employ the pressure in a highly evacuated chamber as the reference against which the suction pressure is measured, instead of atmospheric pressure. While the difference between zero superheat, indicating a floodback condition, and a small positive superheat, a safe operating condition, is difficult to accurately determine accurately because of the need to interpolate temperature values from the ubiquitous service 'pressure-temperature' chart, accurate corresponding saturation temperatures can readily and quickly be generated from digitized stored data or from stored equations.

PRIOR ART

Superheat Gage with Plug-in Data Module
Barbier Patent Number 5,627,770

This is simply a superheat indicating device. It does not disclose any provision for detecting floodback as such. Further, the specification points out at col.2 139–44 that saturated temperatures are almost always employed rather than actual temperatures. It does not disclose or suggest any rate function.

Method and Apparatus for Calculating Super Heat
in an Air Conditioning System
Aloise Patent Number 5,666,815

Aloise teaches the apparatus and method for storing the vapor pressure/temperature models for a number of refrigerants in the integral microprocessor, switch selecting the appropriate refrigerant, observing the desired system temperature and pressure, calculating the saturated temperature for the refrigerant selected, and subtracting the calculated temperature from the observed temperature. Aloise does not discuss any rate function.

Pressure Measurement System for Refrigeration
System
Lockhart Patent Number 5,311,745

Lockhart discloses a process for digitally observing and displaying refrigerant pressure and corresponding temperature. Further, he discloses a process for storing sequential pressure data and displaying the direction of pressure change. (Col 1, lines 55–68) He does not teach measurement of temperature for comparison with the observed pressure or calculated corresponding temperature.

Control System for Preventing Compressor Damage
in a Refrigeration System
Kauffman Patent Number 5,209,076

Kauffman takes a 'shot-gun' approach to compressor protection by observing a multitude of operational parameters including suction superheat, establishing a tolerable range for the parameters and shutting down the compressor in the event one or more of the observed parameters fall outside the pre-established limits. While the disclosure suggests the storage of a series of data points and presentation of 'trends', it does not suggest any particular action be taken with respect to the observed trends, nor, in particular does it suggest any immediate action be taken with respect to any particular rate function.

SUMMARY OF THE INVENTION

The specification discloses novel equipment and processes:

for observing the value and the rate of change of suction superheat near the inlet of a refrigeration compressor;

for observing the value and rate of change of suction temperature at or near the inlet of a refrigeration compressor;

for establishing and storing suction temperature limits;

for establishing and storing suction temperature rate of change limits;

for establishing and storing suction superheat limits for establishing and storing suction superheat rate of change limits for comparing observed suction temperature and its rate of change with the established and stored rates;

for comparing observed suction superheat and its rate of change with the established and stored rates;

and for taking action protective of the compressor when either or both values or rates are repeatedly equal to or exceed the stored rates over a time period.

OBJECTS OF THE INVENTION

It is a primary object of the present invention to provide means for protecting a refrigeration compressor against liquid refrigerant floodback.

It is a further object to provide such protection by measuring the temperature of the suction stream approaching the compressor at predetermined intervals.

It is a further object to provide such protection by measuring the pressure of the suction stream approaching the compressor at times substantially coincident with the times of the temperature measurement.

It is a further object to provide such protection by measuring the pressure of the suction stream at times not substantially coincident with the times of the temperature measurement.

It is a further object to measure such suction pressure employing means of measuring absolute pressure including piezo-resistive pressure measuring means.

It is a further object to provide stored data for calculating saturated refrigerant temperature of the employed refrigerant from the observed suction pressure.

It is a further object to provide such calculating means where the means include a stored model of the refrigerant characteristics.

It is a further object to provide the model on a solid state plug-in memory storage device.

It is a further object to calculate the superheat of the refrigerant suction stream by subtracting the calculated saturated refrigerant temperature corresponding to the coincidently observed refrigerant pressure from the observed suction temperature.

It is a further object to calculate the superheat of the refrigerant suction stream by subtracting the calculated saturated refrigerant temperature, corresponding to refrigerant pressure, from the suction temperature observed at a time later than the time of the pressure measurement from which the saturated refrigerant temperature is calculated.

It is a further object to store a sequence of the periodically observed suction temperatures.

It is a further object to calculate a temperature rate of change of the suction stream from some of the periodically observed temperature values.

In an air conditioning application, it is a further object to activate a control means when the measured temperature of the suction line falls below a set temperature.

In an air conditioning application is it a further object to disable the activation of the control means by temperature when the ambient temperature is lower than a set temperature and in the alternative to enable activation of the control means when the suction temperature rate-of-change exceeds a set value.

It is a further object to store a sequence of the periodically calculated corresponding suction superheats.

It is a further object to calculate a superheat rate of change from some of the periodically calculated superheat values.

It is a further object to provide means for inputting and for storing a predetermined limiting value of superheat.

It is a further object to provide means for inputting and for storing a predetermined limiting value of superheat rate of change.

It is a further object to provide means for inputting and for storing a predetermined limiting value of temperature.

It is a further object to provide means for inputting and for storing a predetermined limiting value of temperature rate of change.

It is a further object to provide means for determining from prior observations such limiting values and for storing them.

It is a further object to provide means for comparing observed temperature values with the stored limiting temperature values.

It is a further object to provide means for comparing calculated superheats with the stored limiting superheat values.

It is a further object to provide means for comparing calculated superheat rates of change with the stored limiting superheat rate of change values.

It is a further object to provide control means for operating alarms and/or compressor protective devices in response to observed temperatures or temperature rates of change or in response to calculated superheats or superheat rates of change that differ from or that exceed, positively or negatively, established or stored rates of change.

And further including the following objects:

To protect an air conditioning or refrigeration compressor from the harmful effects of liquid floodback of an employed refrigerant by providing a stored model of the employed refrigerant saturated characteristics;

Making frequent time based observations of suction temperature and suction pressure near the compressor inlet;

Employing the observed pressure and stored model of the refrigerant saturated characteristics to determine suction superheat from each observation; Determining the time rate of change of both suction temperature and suction superheat;

Establishing and storing rating-of-change limits;

Comparing the observed rates of change with the established rates and taking compressor protective measures when the observed rates exceed the established stored rates.

Storing, but not acting on a first observation of a hazard condition, setting a timer to zero, establishing a time limit, acting on a second observation of a hazard condition within the time limit, erasing the stored first observation of a hazard condition on expiration of the time limit if a second hazard condition has not occurred.

BRIEF DESCRIPTION OF THE DRAWINGS

FIG. 3A is an enlarged crossection of a suction line or conduit illustrating a temperature measuring module mounted on the suction line with the integral temperature sensing element in direct contact with the suction line.

FIG. 3B shows the temperature measuring module mounted on the suction conduit, but with the temperature measuring element inside the module in indirect contact with the suction line and with the casing of the module shaped to provide better contact with the suction line.

FIG. 3C is similar to FIG. 3B with a recess provided in the interior of a casing wall to reduce the wall thickness between the temperature sensor and the suction line.

FIG. 3D is similar to 3A except the sensor is external of the module.

DETAILED DESCRIPTION OF THE INVENTION

Figure 1:
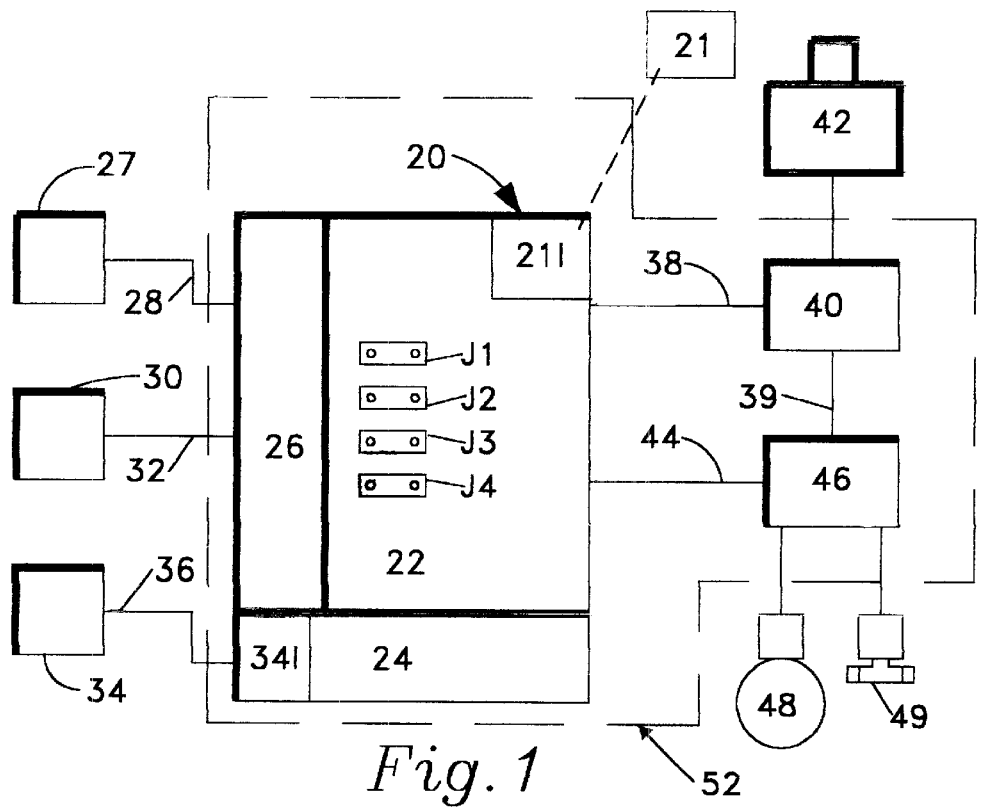
FIG. 1 displays schematically a microprocessor with inputs and outputs related to the invention.

FIG. 1 is a schematic, block-type, representation of the mechanical and electrical mechanism required to perform the several embodiments of the invention. In FIG. 1 there is microprocessor 20 having a calculation section 22, an analog to digital conversion section 26 and a data and program storage area 24. The program storage area also may be employed to store transient temperature and superheat observations for the purpose of calculating rates of change. However, the exact location and physical relationship of the operative electronic components are not part of the invention and they be integrated or separate. There are three analog sensors. These are the pressure transducer 27 that communicates with the A/D processor 26 via conductor 28; the suction temperature transducer 30 that communicates its data to the A/D processor 26 via conductor 32 and ambient temperature sensor 21. The ambient temperature sensor 21 is shown positioned outside the microprocessor assembly. In another embodiment the ambient temperature sensor is shown as 21I and is positioned within the microprocessor assembly.

Temperature sensor 30 is typically a thermistor or a platinum resistance both of whose resistances vary predictably with temperature. The A/D converter has embodied in its memory, or elsewhere within the microprocessor, the constants necessary to calculate the digitized temperature of sensor 30 on receipt of its analog equivalent. Typically, the resistance of leads 32 are not taken into account in the A/D conversion though when the leads are long, some correction may be required.

Figure 2A:
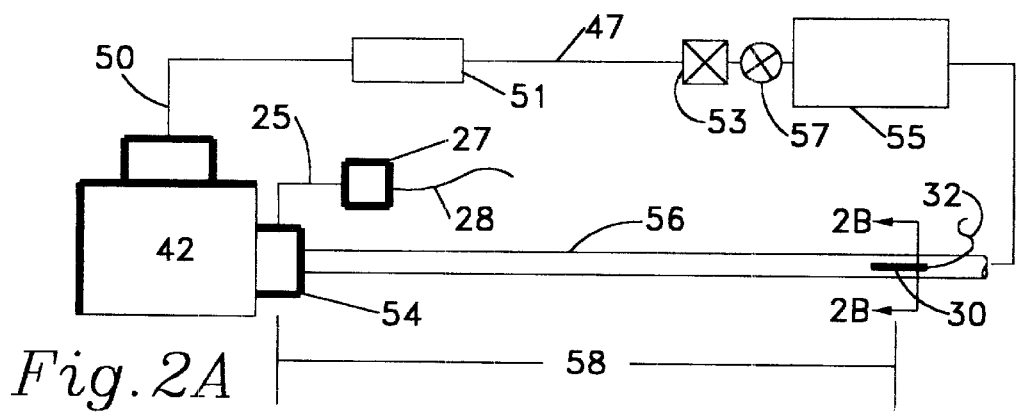
FIG. 2A shows schematic piping of a refrigeration system including a compressor, discharge line, condenser, liquid line, liquid solenoid, evaporator and suction line and positions of several measuring elements.

FIG. 2A displays schematic piping for a refrigeration system. Compressor 42 receives suction vapor from suction line or conduit 56 by way of suction connection and suction pressure tap 54. Compressor 42 compresses the suction vapor and discharges it into discharge line 50 through which the compressed vapor flows to condenser 51 where the vapor condenses to liquid refrigerant. The liquid refrigerant flows to evaporator 55 through liquid line 47 by way of liquid solenoid valve 53 and expansion valve 57. Suction vapor, sometimes mixed with liquid refrigerant, leaves the evaporator and flows back to the compressor through suction line 56 where it is recompressed.

FIGS. 3A through 3D show crossectional representations of housings, attachments and contact improvements where it is desirable for the temperature sensor 30 to be substantially separated from microprocessor 20. Incorporating the analog temperature sensor 30 with the A/D converter 26 allows the communicating conductors to the microprocessor to be as long as necessary without fear of the resistance of the conductors affecting the digitized temperature. Other features of FIGS. 3A–3D are described below.

In FIG. 3A temperature sensor 30 is mounted through a hole in casing 80 and is sealed thereto to prevent entry of moisture. The circuit board 72 is connected to temperature sensor 30 and may include either the A/D convertor 26 or the entire microprocessor. Power lead 64 and output lead 66 are connected to the circuit board 72 as required. Strap 60 secures the assembly 80 with included temperature sensor 30 to the suction line 56 under conditions shown in FIGS. 2A and 2B. The distance 58 of the temperature sensor 30 from the suction connection of the compressor is preferably less than 6 inches in order to best represent the temperature of the fluids entering the compressor 42. However, if the suction line is well insulated, distance 58 may be greater.

Figure 2B:
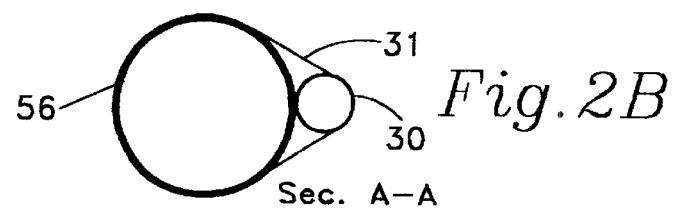
FIG. 2B is a section of the suction line shown in FIG. 2a including the temperature measuring element.

FIG. 2B is a cross section at 2B—2B of suction line 56 and suction temperature sensor 30 in FIG. 2A. Strap 31 is shown securing the temperature sensor 30 to suction line 56, thereby assuring that temperature sensor 30 will exhibit substantially the same temperature as the suction line at that location.

In FIGS. 3B and 3C the circuit board 72 is shown embedded in a foam or other insulating matrix 78 within a shaped housing 62 that has been provided with a cylindrical convexity 76 to better fit and better provide heat transfer contact with suction line 56. In FIG. 3C a recess 75 has been provided in the wall of housing 62 to allow temperature sensor 30 to more closely approach suction line 56. In FIGS. 3B and 3C, also, an LED or other continuously lit pilot light 68 is provided to indicate a power on condition in a continuously lit mode and an alarm condition in a flashing mode.

FIG. 3D shows module 82 with connecting conductor 32 sealed through the wall of case 80, thereby allowing temperature sensor 30 to be remotely positioned from the module 80.

The superheat measurements use an absolute pressure transducer 27 to insure that the refrigerant pressure, employed as the primary parameter to evaluate the corresponding saturated refrigerant temperature, is correct regardless of elevation or barometric pressure. While a piezo-silicon absolute pressure transducer is preferred for non-corrosive environments, other types of absolute pressure transducers may be preferred for other environments. For example, the absolute pressure transducer can be a silicon piezo-resistive type for halogenated refrigerants but a unit with a stainless steel isolating diaphragm may be preferred for corrosive refrigerant applications such as ammonia.

Referring again to FIG. 1, the microprocessor 20 uses the program stored in area 24 to direct the processor 22 to transmit the analog inputs of pressure and temperature from the corresponding transducers 27, 21(I) and 30 to an analog to digital (A/D) conversion program 26 to convert the analog inputs to the digital form required by the microprocessor.

The microprocessor 22 or its related circuit board has four sets of jumpers, J1 through J4. These can be user selected and operating and timing parameters user set to fit the application requirements as follows:

J1: Application selection: Refrigeration or air conditioning:
  Jumper ON: air conditioning (40 F evaporating temperature)
  Jumper OFF: refrigeration (25 F or lower evaporating temperature
J2: Timer set (Time duration that liquid solenoid is kept closed on violation of a set point.)
  Jumper ON: 5 minutes
  Jumper OFF: 10 minutes
J3: Suction temperature trip setting (AC only;. Refrigeration selection (J1 OFF) ignores this setting and employs rate only.
  Jumper ON: 40 F
  Jumper OFF: 45 F
J4: Limiting rate of change: This is typically 0.6 F per second (jumper ON) but is nuisance trips occur, the Jumper OFF condition will set the limiting rate of change to a higher value, typically 1.0 F per second.

MINIMUM SUCTION TEMPERATURE EMBODIMENT

A minimum suction temperature embodiment employs only microprocessor 20 plus temperature sensor 30. In this embodiment, a minimum suction line or suction vapor temperature is established, typically by mechanically selecting the air conditioning (as distinct from the refrigeration) mode and by selecting a minimum suction temperature in the range from 40 F to 45 F. This minimum suction temperature would, in one construction, be factory selected. In another option, jumpers J1 and J3 would be set. J1 is used to select the air conditioning mode and J3 to select the minimum tolerable suction line temperature. In a third option, a rotary switch or rheostat with an evaporating temperature scale would be employed to allow field selection of the operating condition. In normal operation the suction line temperature for an air conditioning system is expected to be 15 F or 20 F higher than the 40 F evaporating temperature and the minimum setting would be 40 F or 45 F. Since suction line temperature transients are likely to occur because of expansion valve hunting (random or cyclic variations between maximum and minimum settings) periodic random violations of the minimum temperature settings are likely to occur. In another embodiment a timer is started when the minimum setting is violated and the protective action is effectuated. Among these protective actions are: permanently stopping the compressor if the duration of the violation exceeds a predetermined time such as 15 seconds; temporarily stopping the compressor; temporarily stopping the compressor but counting the number of repeat stoppages within a defined period and locking off the compressor if the number of stoppages exceeds a predetermined number. The duration of the stoppage would be subject to rise in the observed suction temperature above a predetermined temperature or, in the alternative elapse of a predetermined time. A single instantaneous violation or alarm event would be programmed, in one embodiment, to simply light or cause to flash an LED 68. In another embodiment the event is caused both to light LED 68 and to temporarily stop the compressor and close liquid line solenoid 49, thereby stopping liquid refrigerant flow to the evaporator which is the source of the floodback. In a third embodiment the event causes the compressor to stop but to automatically restart after a predetermined time or after the observed suction temperature rises above the preselected minimum suction temperature.

In a more sophisticated version, the event is employed to start a timer having a predetermined setting, typically 30 to 90 minutes. The timer would be part of the microprocessor 22. If a second or third alarm event occurs during the timing period, a system protective action or a compressor protective action is generated. This protective action requires ringing an alarm 48, actuating the compressor contactor relay 40 via conductor 38 or 39 and thereby shutting off and locking off compressor 42. Other protective actions would be employed for different systems and compressor types. If the compressor 42 is locked off it could then be restarted only by human intervention, such as manually resetting the timer.

In the air-conditioning case, if the ambient temperature around the compressor and the control is less than about 55 F, 15 F higher than the normal air-conditioning evaporating temperature, the suction line temperature during the compressor off cycle will be less than the preset lower temperature limit for suction line temperature thereby causing a malfunction on attempted start. To cope with this situation, an ambient temperature sensor 21 is provided. Microprocessor 22 is programed so that no alarm event is triggered if the ambient temperature is equal to or less than 55 F. In that temperature environment, the embodiment of the invention testing for and responding to suction temperature rate of change is required. Where the microprocessor and its power supplies are in a compressor room or cabinet 52 that is warmer than the environment of compressor 42, it is important that the ambient temperature sensor 21 be positioned remotely from the microprocessor and subject to the compressor environment. However, when the microprocessor is located in the same environment as the compressor, the ambient temperature sensor can be located as part of or on the same circuit board with the microprocessor as sensor 21I. Where the temperature corresponding to the refrigerant pressure in the evaporator is much lower than 40 F–45 F, a lower critical ambient temperature could be selected. Typically, the critical temperature would be selected to be about 10 F higher than the normal saturated evaporating temperature. In the event the ambient temperature around the compressor falls below the minimum causes the microprocessor 22 to transition from minimum suction temperature mode to maximum suction temperature rate-of-change mode, described below.

On such selection embodiment would employ jumper J1 to select the refrigeration mode where an alarm event cannot be triggered by a suction temperature observation lower than the 40 F or 45 F setting. A calibrated rheostat could be substituted to allow even greater flexibility in temperature selection. The calibrations would state the normal evaporating temperature and the microprocessor would automatically set the minimum ambient temperature about 15 F higher.

Figure 6:
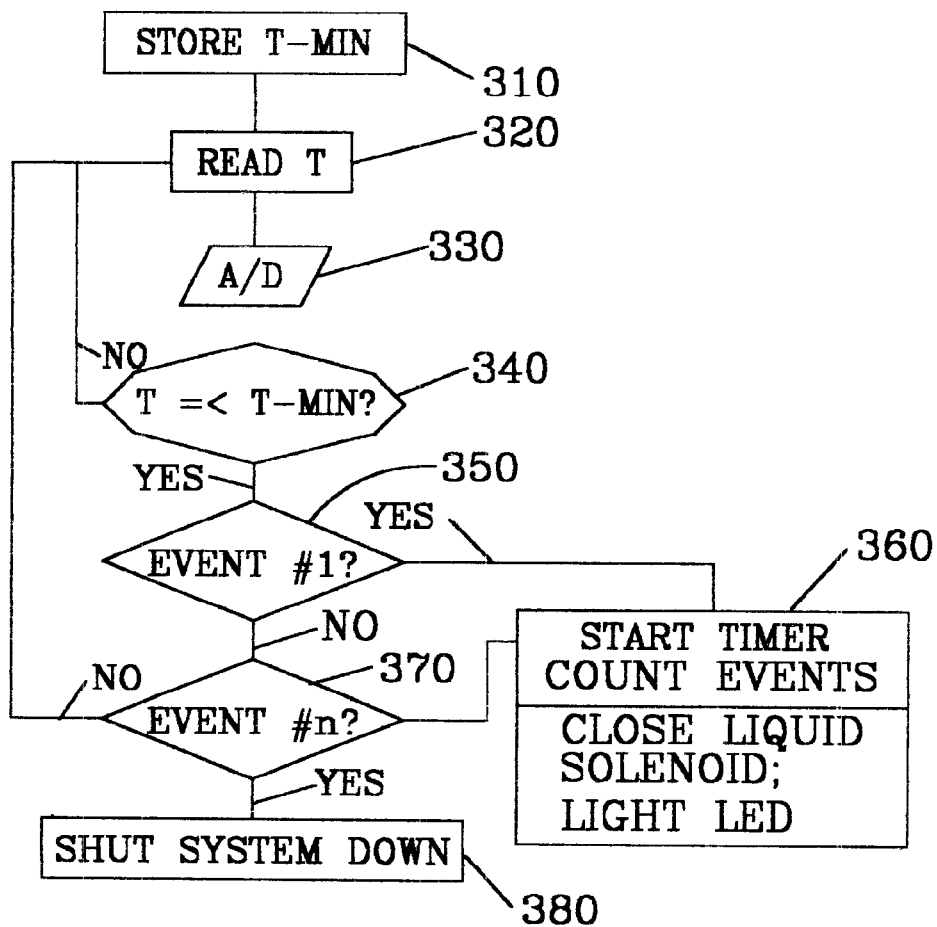
FIG. 6 is a flow chart showing steps in the sensing and alarm process for the minimum temperature system or optionally for the minimum superheat system.

FIG. 6 sets forth a simplified sequence describing the data observation and calculation steps in a minimum suction temperature alarm system. The reference numerals identify the various functions. The first step 310 is to store in memory the minimum suction line temperature that is to be tolerated before an event is triggered. Typically, for an air conditioning system, that temperature is 40 F to 45 F. The limiting temperature or Tmin may be software selected by the manufacturer or switch or jumper selected by the user, as by jumper J3.

The program 330 reads the suction temperature, employing sensor 30, and has the analog temperature converted 330 to a digital temperature by the use of constants embedded in the program. The temperature observed is compared 340 with the stored 310 minimum temperature. If the observed temperature is not less than the stored minimum, the program simply recycles back to step 330 and the suction line temperature is read again. If the observed temperature is equal to or less 310 than the stored minimum temperature, counter 350 is polled. If this is the first event, the timer 360 and n-event counter 370 are started and optionally the warning LED is lit and the liquid solenoid valve closed. If the event is not the nth, step 370, the program recycles back to step 320 to read T again. If it is the nth event, system protection action 380, such as shutting off the compressor is effectuated.

Optionally the program will temporarily stop the compressor and simultaneously start a timer having a preset time, typically 15 minutes. On violation of the preset minimum observed suction temperature, the compressor can be restarted by the timer at the end of the preset time.

In another embodiment, violation of the minimum suction temperature starts two timers, the second timer set for a duration three to four times longer than the duration setting of the first timer. The program counts the number of successive violations of the minimum suction temperature and permanently locks the compressor off after a specified number of violations, typically three, within the time setting of the second timer.

In another embodiment the duration of the violation of the suction line temperature limit is timed and if duration exceeds a preset time such as 15 seconds, the compressor is turned off.

MAXIMUM SUCTION TEMPERATURE RATE-OF-CHANGE EMBODIMENT

This embodiment of the invention establishes and stores a limiting maximum rate of suction line temperature change. The reference to equipment elements is generally directed to FIGS. 1–3 and the description of the process is directed to FIGS. 4 and 6. To achieve a temperature rate of change measurement, a time base of uniform time intervals is established by the program stored in 24. The suction line temperature is measured at each interval, so that there is the same time increment between each suction line temperature measurement. Typically, a suction line temperature is measured and stored in the temporary storage facilities available in microprocessor area 22, however, other storage area are possible. The immediately succeeding suction line temperature is subtracted from the immediately earlier temperature, this difference being a number that is equivalent to the temperature rate of change. The actual temperature rate of change would be calculated by dividing the difference by the time intervals. However, because all the time intervals are equal, any ratio of equivalent rates would be identical to a ratio of exact rates because the time constant would cancel out.

Figure 7:
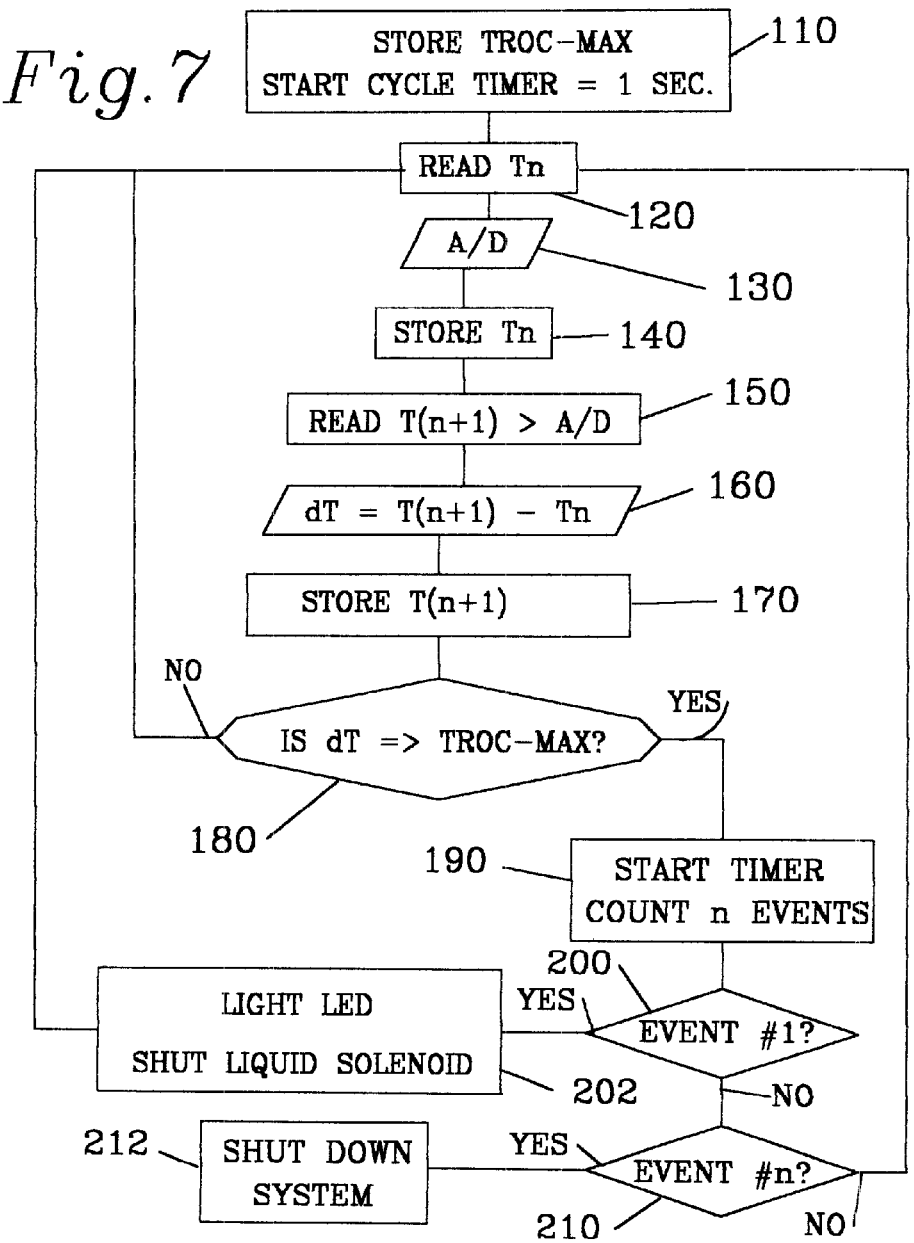
FIG. 7 is a flow chart showing steps in the sensing and alarm process for the temperature rate-of-change system or optionally for the superheat rate-of-change system.

Each observed/calculated rate is compared with the maximum stored rate. If the observed rate is less than the stored rate it is simply discarded. If the observed rate is greater than the stored rate, an alarm event is caused. The alarm event causes the liquid solenoid valve 49 to close for a predetermined period and starts a count down timer. If a second alarm (or third) event arises during the count down period, a compressor protective action is generated. Referring now to FIG. 7, there is shown a block diagram for sensing and activating alarms on suction line temperature rate of change. At step 110 the maximum equivalent temperature rate of change is set, TROC-max. The cycle timer that establishes a regular rate of suction temperature observations is also started. For simplicity, this rate is shown as one second, however, other rates could be suitable. The suction temperature is read (step 120) and converted to digital form (step 130). The digitized temperature is temporarily stored as Tn at step 140. At step 150 sensor 30 is again read as T(n+1) and digitized. At step 160 the difference between the consecutive temperatures is calculated. This difference is the equivalent rate, dT, even for time intervals other than one second. At step 170, T(n+1) is stored, replacing Tn.

At step 180 the observed rate dT is compared with the maximum rate stored at step 110. If the observed rate is less than the maximum rate (NO), the program simply recycles back to step 120 to read the suction line temperature again. If the rate is equal to or greater than the stored maximum rate (YES) the interval timer and counter are initiated at step 190. If at step 200 the event is only number 1 (NO), the liquid solenoid valve is closed and the warning LED lighted at step 202. Naturally, many other types of protective or alarm actions can be taken such as dialing a central number, entering the internet and sending an e-mail, etc. The program at step 202 then recycles back to step 120 to read suction temperature again.

If however at step 210, the event is the nth event (YES), then system protective action is taken at step 212. The most severe such action, is shutting down the compressor. Other actions could require ringing an alarm, slowing down the compressor, etc.

In another embodiment of the suction line temperature rate of change structure, the compressor is turned off immediately when the suction line temperature rate-of-change exceeds a preset value. The duration of the off period is determined in one embodiment by a timer set to restore compressor operation after a preset period, such a 5 minutes. In another embodiment, the compressor remains off until the temperature of the suction line rises above a predetermined temperature such as the minimum allowable temperature plus 15 F. In this embodiment a timer is started at the time of the first violation when the compressor is first turned off. The timer resets after a reasonably long period such as 60 minutes. If, after the first violation and compressor restart, subsequent violations are observed before the 60 minute timer resets, the compressor is turned off and locked off to await manual restart and trouble diagnosis.

It should be understood that the above described block diagrams are not intended to be computer programs since these would require much greater complexity such as effectuation of intermediate storages and counters and timers all of which are well known to those skilled in the protective programming art.

SUCTION TEMPERATURE RATE-OF-CHANGE; GRAPHICAL EXPLANATION

Figure 4:
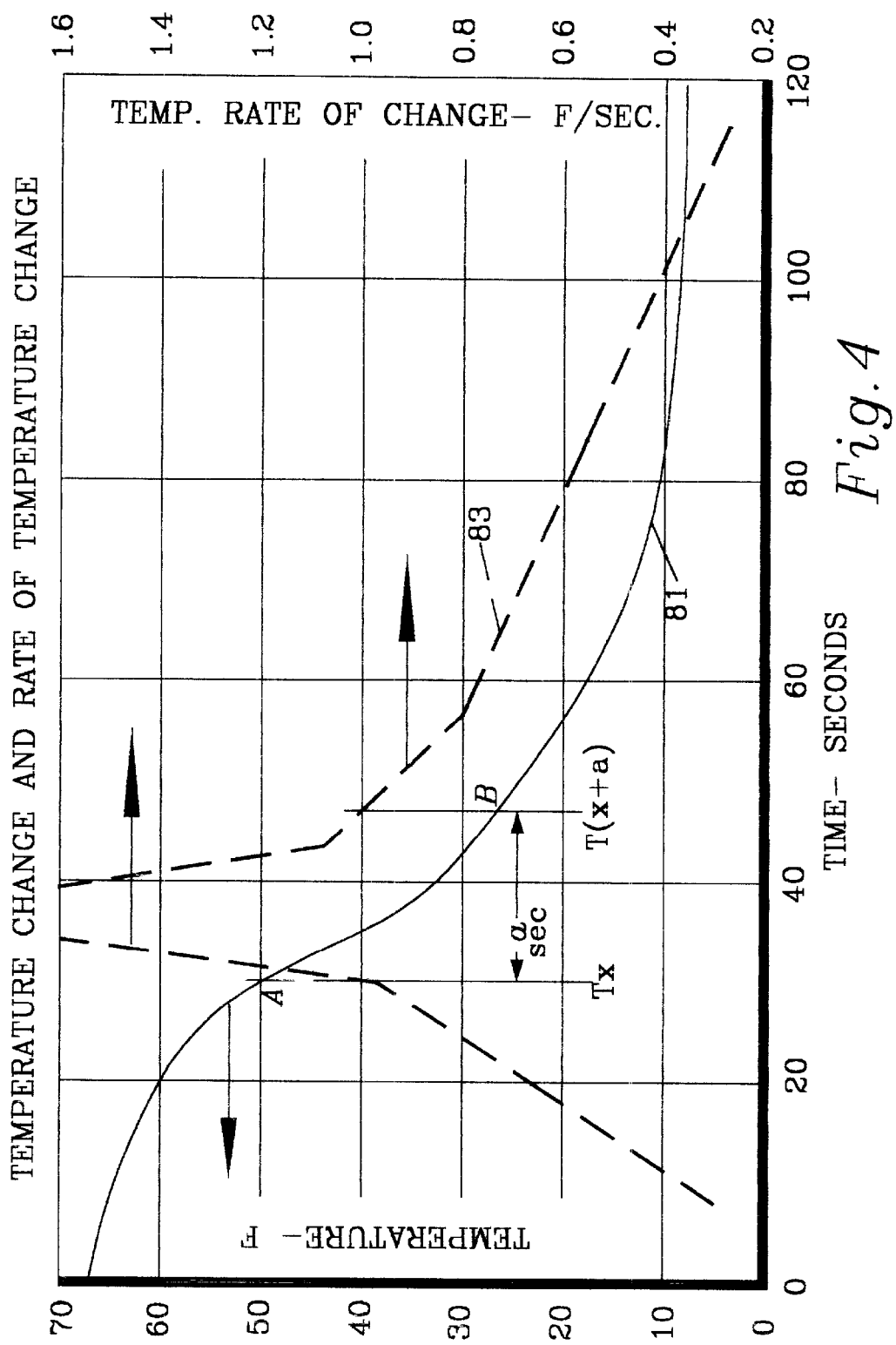
FIG. 4 is a schematic representation of typical temperature changes with time that occur in a suction line as floodback just begins; and the calculated temperature rates of change on the same time scale.

In FIG. 4 there is shown a graph having a horizontal time base abscissa in seconds, a left side ordinate in degrees Fahrenheit (F) temperature and a right side ordinate in degrees F temperature per second (F/Sec.), the units of rate-of-change. The unbroken line 81 is identified as temperature by a left pointing arrow. The heavier dashed line 83 is identified as cooling temperature rate-of-change by a right pointing arrow.

It should be noted that no representation is made that either the temperature nor the temperature rate-of-change lines can be precisely validated by comparison with any physical system since different types of systems and different types of construction and sensors and indicators produce different temperature and rate curves. However, all the curves, so far observed, have markedly similar shapes to which the principles of this invention apply.

Referring again to FIG. 4 there is plotted suction line temperature for a typical refrigerating system whose evaporator is operating at a OF evaporating temperature. That is, the pressure in the evaporator and suction line, when referred to a temperature—pressure chart, corresponds to a saturated refrigerant temperature of 0 F for that refrigerant.

The temperature T of the suction line has a value of about 67 F at zero time, when these observations are started. A potential floodback condition has been generated by stoppage of the evaporator fans, thereby reducing the load on the evaporator to substantially zero. This is not an unusual cause of floodback. The measured temperature of the suction line at a position about five inches from the compressor inlet (FIG. 2a) is plotted against time and the solid line identified by the left pointing arrow represents the suction line temperatures measured over a two minute period. Notice that the temperature of the suction line begins to fall slowly, then the temperature drops more and more sharply over the period from 25 to 60 seconds, then the temperature drops more slowly as the measured temperature approached about 5 F.

The rate-of change of the suction line temperature has been calculated by measuring the suction line temperature Tx at a first time x and later at a second time T(x+a), (a) seconds later and dividing the difference between the two temperatures by the number of seconds, a, between the two temperature observations. Where the time between the measurements is longer than one second but otherwise constant, the shape of the curve will be similar, but not as abrupt, as the curve shape where one second is the base. In other words, an actual division operation need not occur, so long as the time interval between measurements is constant. However, a rate of change so reported is sufficiently accurate for the designated purposes.

While a single rate-of-temperature change is an important parameter and, itself, may be employed to trigger an alarm or corrective action; there is a continuing risk that a transient condition will trigger such action. Therefore, a second test, that of duration of the high rate of temperature change, may be imposed to identify with greater certainty a condition requiring an alarm, or corrective action.

In FIG. 4 points A and B identify the beginning and end of a 17 second time period during which the cooling temperature rate of change exceeds an imposed set point of 1 F/second. In addition to a set limit on the cooling temperature rate of change, a second additional set limit is established requiring at least n consecutive rate observations that exceed the set limit of cooling-temperature rate-of-change.

Such an arrangement, requiring a predetermined number of temperature measurements, all exceeding the set rate limit, acts to minimize nuisance trips or alarms produced during normal operation and restricts such trips to truly dangerous conditions. The selection of a time base is dependent on the structure of the system. In a small system, for instance one having a ⅞ OD suction line, a high rate of temperature change could be expected because of the relatively low mass of the components. In a larger system having, for instance, a 4 ⅛ OD suction line, a slow temperature response may be observed and therefore a longer time base employed.

It should be noted that, while a longer time base might minimize nuisance alarms or trips, such a longer time base might reduce the sensitivity of the apparatus. That is because the temperature during part of the longer time base may have been at a lower temperature rate, thereby diluting the effect of the rapid temperature rate of change that a shorter time base would disclose.

Assuming a cycle time of one second per reading, four or five consecutive values exceeding the set limit of 1 F/sec.

Could satisfy the alarm and/or trip or exit into compressor protective mode. In another mode, two consecutive excess rates could be employed to trigger an alarm and five consecutive excess rates to close the liquid solenoid valve and eight consecutive excess rates to shut off the compressor.

The time base should be selected with sufficiently short duration that at least four consecutive iterations having values in excess of the set point are possible during a condition of actual incipient floodback.

In the alternative, an observation of temperature or rate of change is stored in a memory and a clock started but no overt alarm action begin, other than, for example, lighting a diagnostic LED lamp. Should a second occurrence of such an alarm condition be observed within a designated period, for instance 10 minutes, a hazard condition will be activated and the appropriate alarms and/or corrective actions begun.

SUPERHEAT AND SUPERHEAT RATE OF CHANGE EMBODIMENTS

Referring again to FIG. 1, a third embodiment of the invention requires the use of pressure transducer 27 with its connection 28 to A/D converter 26 and the pressure—temperature data module 34 with its plug-in connection 36 to the microprocessor 20.

Refrigerant absolute pressure-temperature saturation tables are contained in an electronic memory mounted on an electronic assembly printed circuit board contained in data module 34. The data may alternately be stored in section 34I as part of the memory section 24 of microprocessor 20. The preferred construction provides the memory containing the pressure-temperature saturation tables as part of a removable and replaceable module 34 that establishes electrical connection to the assembly containing microprocessor 20 and analog to digital conversion program area 26, via prongs 36. While details of the prongs projecting from the removable memory and the receptacle that is part of the microprocessor 20 assembly 52 into which the prongs 36 removably connect are not shown, this type of construction is well known from vacuum tube days when crystal oscillators and other devices were similarly removably connected to their operative assemblies. In the instant case a preferred construction is similar to the plug-in absolute pressure-temperature memory 92 described in U.S. Pat. No. 5,627,770.

Continuing reference to FIG. 1, plug-in storage module 34 has embedded in its memory the pressure temperature characteristics of a specific refrigerant such as HFC-134a. The data may be in tabular form or in equation form. Plug-in connections or prongs 36 allow removable communication between module 34 and the microprocessor 20. Having this plug-in capability allows microprocessor 20 to adapt to a wide variety of refrigerants for which data modules 34 are available and, in particular allows the microprocessor to be useable for a wide variety of future refrigerants, as yet unknown, for which data at present is unavailable.

Pressure transducer 27 is typically a piezo-resistive silicon based device that is constructed to measure absolute pressures. The absolute pressure transducer is installed remotely with a cable 28 for communication with the electronic circuit and is connected to the suction side of the compressor at suction service valve 54 by conduit 25 as shown in FIG. 2a.

While the absolute pressure transducer 27 can be connected to the suction pressure most conveniently thru the suction service valve service fitting 54 as shown in FIG. 2a, it is important that the connection be made at or near the place that the suction temperature sensor is positioned. The most desirable position for the temperature measurement sensor is at a distance 58 that is greater than about five inches from the compressor service valve to avoid being influenced by the temperature of the compressor body, although greater distances 58 can be employed, so long as no pressure-drop producing filters or regulating valves are positioned between the point of pressure measurement and the point of temperature measurement.

The microprocessor uses a program stored in program storage area 24 to read the analog inputs of temperature and pressure, direct analog to digital conversion of the analog inputs in area 26, question the refrigerant tables stored in module 34 with the digital pressure and receive the digital corresponding saturation temperature, perform the calculations to determine superheat, perform temperature rate calculations, perform superheat rate calculations and finally compare calculated superheats and temperature and superheat rates with the established set points.

When the established set points have been traversed, the stored program directs the microprocessor 22 to initiate an output signal or alarm event. The output signal may actuate controller 40 via connection 38 and turn off compressor 42 and optionally, via connection 39 also actuate alarm controller 46 and alarm 48. The output signal or alarm event may be programmed, in the alternative, to actuate alarm controller 46 via connection 44 and then either or both actuate alarm 48 and close liquid solenoid 49, thereby shutting off liquid flow to the evaporator from where floodback originates.

The use of the rate of change of the decreasing suction temperature provides a means to anticipate that floodback is imminent well before a flooding value of superheat would be measured.

GRAPHICAL EXPLANATION OF SUPERHEAT RATE-OF-CHANGE

Figure 5:
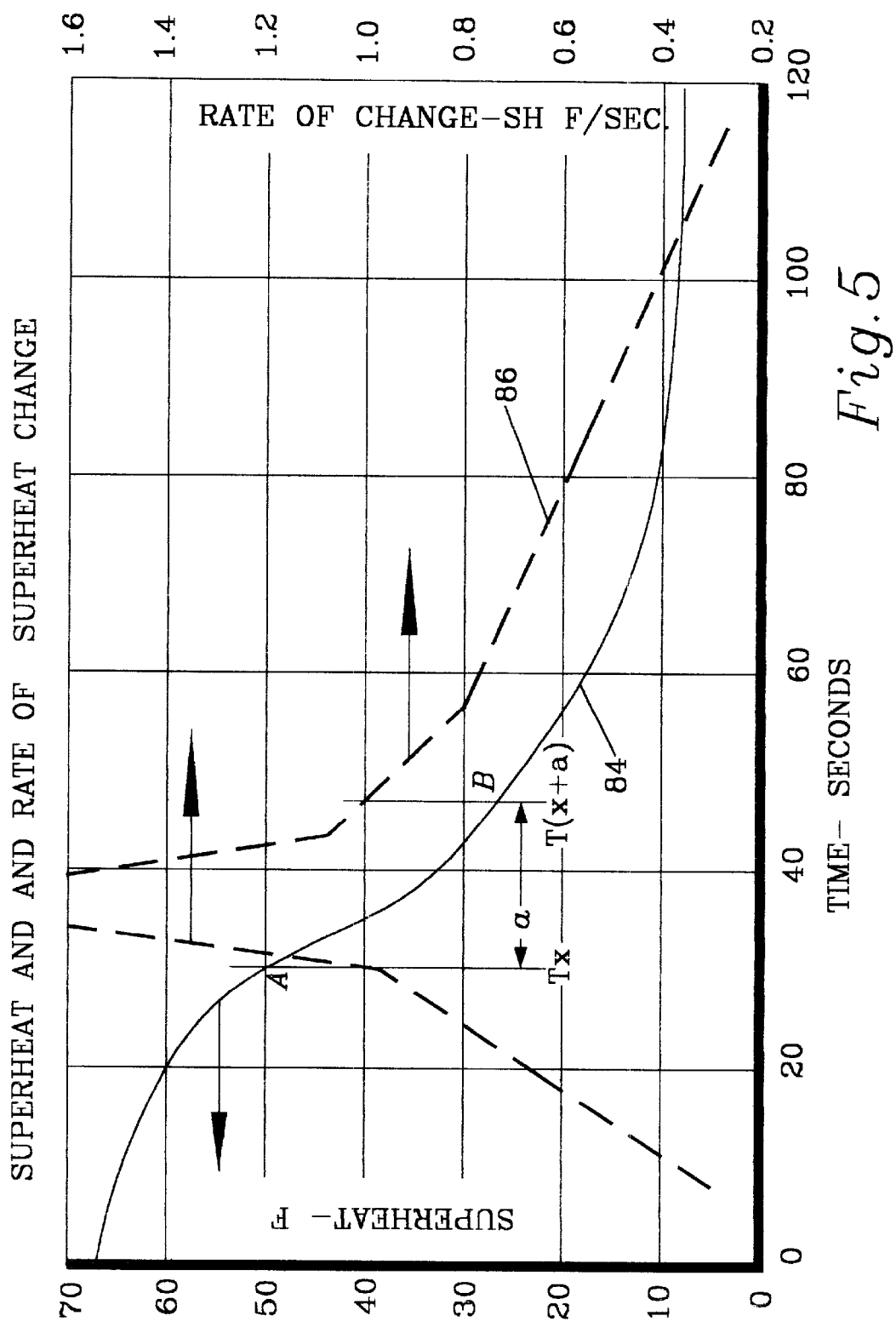
FIG. 5 is a schematic representation of typical superheat changes with time that occur in a suction line as floodback just begins; and the calculated superheat rates of change derived therefrom, on the same time scale.

In FIG. 5 there is shown a graph having a horizontal time base abscissa in seconds, a left side ordinate in degrees Fahrenheit (F) superheat and a right side ordinate in degrees of superheat F per second (SH-F/S)., the units of rate-of-change. The unbroken line 84 is identified as superheat by a left pointing arrow. The heavier dashed line 86 is identified as superheat rate-of-change by a right pointing arrow.

It should be noted that no representation is made that either the superheat nor the superheat rate-of-change lines can be precisely validated by comparison with any physical system since different types of systems and different types of construction and sensors and indicators produce different superheats and superheat rate of change curves. However, all the curves, so far observed, have markedly similar shapes to which the principles of this invention apply.

Referring again to FIG. 5 there is plotted suction line superheat for a typical refrigerating system whose evaporator is operating at a of evaporating temperature. That is, the pressure in the evaporator and suction line, when referred to a temperature—pressure chart, will correspond to a saturated refrigerant temperature of 0 F for that refrigerant.

The superheat SH of the suction line has a value of about 67 F at zero time, when these observations are started. A potential floodback condition has been generated by stoppage of the evaporator fans, thereby reducing the load on the evaporator to substantially zero. The measured superheat of the suction line at a position about five inches from the compressor inlet is plotted against time and the solid line identified by the left pointing arrow represents the suction line superheats measured over a two minute period. Notice that the superheat of the suction line begins to fall slowly, then the superheat drops more and more sharply over the period from 25 to 60 seconds, then the superheat drops more slowly as the measured superheat approached about 5 F.

The rate-of change of the suction line superheat has been calculated by measuring the suction line superheat SHx at a first time Tx and (a) seconds later at a second time T(x+a), and dividing the difference between the two superheats by the number of seconds, a, between the two superheat observations. Where the time between the measurements is different from one second but otherwise constant, the shape of the curve will be identical to the curve shape where one second is the base. In other words, an actual division need not occur, so long as the time interval between measurements is constant.

While the rate-of-superheat change is an important parameter and, itself, may be employed to trigger a corrective action; there is a continuing risk that a transient condition will trigger such action. Therefore, a second test, that of duration of the high rate of superheat change, may be imposed to identify with greater certainty an alarm, or corrective condition.

In FIG. 5 points A and B identify, on superheat line 84, the beginning and end of a 17 second time period a during which the rate of superheat change, plotted as line 86, exceeds an imposed set point of 1 F/second. In addition to a set limit on the rate of superheat change, a second additional set limit is established requiring at least n consecutive rate observations that exceed the set rate limit.

In the alternative, an observation of rate of change is stored in a memory and a clock started but no overt alarm action begin, other than, for example, lighting a diagnostic LED lamp. Should a second occurrence of such an alarm condition be observed within a designated period, for instance 10 minutes, a hazard condition will be activated and the appropriate alarms and/or corrective actions begun.

Such an arrangement, requiring an established sequence of measurements, all exceeding the set rate limit, acts to minimize nuisance trips or alarms produced during normal operation and restricts such trips to truly dangerous conditions. While a longer time base could be established that might also minimize nuisance alarms or trips, such a longer time base might reduce the sensitivity of the apparatus. That is because part of the longer time base may have been at a lower superheat rate, thereby diluting the effect of the rapid superheat rate of change that a shorter time base would disclose.

Assuming a cycle time of one second per reading, four or five consecutive values exceeding the set limit of 1 F/sec. Could satisfy the alarm and/or trip requirement. In another mode, two consecutive excess rates could be employed to trigger an alarm and five consecutive excess rates to close the liquid solenoid valve and eight consecutive excess rates to shut off the compressor.

An embodiment employing minimum superheat only, as distinct from superheat rate-of-change may be implemented employing the same logic as employed for the minimum suction temperature embodiment.

From the foregoing description, it can be seen that the present invention comprises embodiments of advanced protective devices for refrigeration compressors. It will be appreciated by those skilled in the art that changes could be made to the embodiments described in the foregoing description without departing from the broad inventive concepts thereof. It is understood, therefore, that this invention is not limited to the particular embodiment or embodiments disclosed, but is intended to cover all modifications which are within the scope and spirit of the invention as defined by the appended claims, by each of their elements and equivalents thereof.

I claim:

1. A floodback detector for a refrigeration system comprising:
    means for establishing a maximum rate of suction temperature change,
    means for observing consecutive suction temperatures at regular time intervals;
    means for calculating a suction temperature rate of change;
    means for comparing the calculated rate of suction temperature change with the established maximum rate of suction temperature change;
    means for establishing a minimum allowable suction temperature; and
    means for stopping the compressor on the condition that the calculated rate of change is equal to or greater than the established rate of change, and
    means for automatically restarting the compressor after the observed suction temperature has risen to a temperature equal to or higher than the minimum allowable suction temperature plus 15 F.

2. A floodback detector for a refrigeration system comprising:
    means for establishing a maximum rate of suction temperature change;
    means for observing consecutive suction temperatures at regular time intervals;
    means for calculating a suction temperature rate of change;
    means for comparing the calculated rate of suction temperature change with the established maximum rate of change;
    means for establishing a compressor protective action on the violation condition that the calculated rate of change is equal to or greater than the established rate of change.

3. A floodback detector for a refrigeration system as recited in claim 2 where the compressor protective action comprises means for stopping and automatically restarting the compressor.

4. A floodback detector for a refrigeration system as recited in claim 2, further providing means for establishing a minimum allowable suction temperature;
    where the compressor protective action comprises means for stopping and automatically restarting the compressor after the observed suction temperature has risen to a temperature equal to or higher than the minimum allowable suction temperature plus 15 F.

5. A floodback detector as recited in claim 2 further providing first timer means having a first reset period and where the compressor protective action comprises:
    means for stopping the compressor and simultaneously starting first timer means and means for automatic compressor restart on the elapse of the first reset period.

6. A floodback detector for a refrigeration system as recited in claim 3 further providing second timer means having a reset period; and further providing a manual compressor restart mode;
    means for initiating second timer operation substantially simultaneously with stopping the compressor on a first violation, and means for stopping the compressor in the manual restart mode on the condition of reoccurrence of the compressor stoppage before the end of the reset period of the second timer means.

7. A floodback detector for a refrigeration system having a compressor, an evaporator and suction conduit means for refrigerant flow between the evaporator and the compressor, said flow including possible refrigerant liquid floodback to the compressor, the suction conduit means being subject to periodic changes of conditions selected from the group consisting of temperature and superheat;

said refrigerant floodback being accompanied by changes in a selected condition occuring at a greater rate than a predetermined maximum rate;

said detector comprising:

means for establishing and storing a maximum rate of change for a condition, means for periodically measuring the condition, means for determining a rate of change of the condition from at least two of the periodic measurements, and means for generating an alarm event on the determination of a rate of change of the condition in excess of the predetermined maximum rate.

8. A floodback detector for a refrigeration system as recited in claim 7 where the condition is temperature.

9. A floodback detector for a refrigeration system as recited in claim 8 further providing that the alarm event includes means for stopping and automatically restarting the compressor.

10. A floodback detector as recited in claim 9 further providing that the means for automatically restarting the compressor includes first timer means having a first reset period, said timer means being arranged to start timing on the occurance of the alarm event when the compressor stops and to restart the compressor on elapse of the first reset period.

11. A floodback detector as recited in claim 10 further providing second timer means having a reset period and further providing a manual restart mode and means for starting the compressor in the manual restart mode on the condition of recurrance of the compressor stoppage before the end of the reset period of the second timer means.

12. A floodback detector as recited in claim 11 further providing counter means for counting the number of alarm events, and means for starting the compressor in the manual restart mode on the condition of more than two alarm events occurring before the end of the reset period of the second timer means.

13. A floodback detector as recited in claim 7 where the condition is superheat.

14. A floodback detector for a refrigeration system as recited in claim 1 further providing that the alarm event includes means for stopping and automatically restarting the compressor.

15. A floodback detector as recited in claim 9 further providing that the means for automatically restarting the compressor includes first timer means having a first reset period, said timer means being arranged to start timing on the occurance of the alarm event when the compressor stops and to restart the compressor on elapse of the first reset period.

16. A floodback detector as recited in claim 10 further providing second timer means having a reset period and further providing a manual restart mode and means for starting the compressor in the manual restart mode on the condition of recurrance of the compressor stoppage before the end of the reset period of the second timer means.

17. A floodback detector as recited in claim 11 further providing counter means for counting the number of alarm events, and means for starting the compressor in the manual restart mode on the condition of more than two alarm events occurring before the end of the reset period of the second timer means.

18. A floodback detector for a refrigeration system comprising:

means for establishing a maximum rate of suction temperature change, means for observing consecutive suction temperatures at regular time intervals;

means for calculating a suction temperature rate of change;

means for comparing the calculated rate of suction temperature change with the established maximum rate of change;

means for stopping the compressor on the condition that the calculated rate of change is equal to or greater than the established rate of change, and further providing means for automatically restarting the compressor said restarting means comprising:

first timer means for measuring a first preset time interval, means for starting the first timer means simultaneously with the actuation of the compressor stopping means, and means for restarting the compressor on the elapse of said first preset time interval.

19. A floodback detector for a refrigeration system as recited in claim 18 comprising:

second timer means having a second reset period and further providing a manual compressor restart mode;

means for initiating second timer means operation substantially simultaneously with stopping the compressor on a first violation, and means for stopping the compressor in the manual restart mode on the condition of one reoccurrence of the compressor stoppage before the end of the second reset period.

20. A floodback detector as recited in claim 19 further providing, means for establishing a maximum number of compressor stoppage events and, means for counting the number of compressor stoppage events occurring during the second reset period, and means for stopping the compressor in the manual restart mode on the occurrence of a greater number of stoppage events than the maximum.

21. A floodback detector for a refrigeration system comprising:

means for establishing a maximum cooling rate of suction temperature change;

means for observing consecutive suction temperatures at regular time intervals;

means for calculating a suction temperature cooling rate of change;

means for comparing the calculated cooling rate of suction temperature change with the established maximum cooling rate of change;

means for stopping the compressor when the calculated cooling rate of suction temperature change is equal to or greater than said established maximum cooling rate of suction temperature change.

22. A floodback detector for a refrigeration system as recited in claim 21 further comprising:

means for establishing a minimum suction temperature and means for restarting the compressor on the condition that the temperature of the suction line has risen to a temperature equal to the minimum suction temperature plus 15 degrees.

23. A floodback detector for a refrigeration system having a compressor, an evaporator, and suction conduit means for refrigerant flow between the evaporator and the compressor, said flow including possible refrigerant liquid floodback to the compressor, said refrigerant floodback being accompanied by reductions in the temperature of said suction conduit means occurring at a greater rate than a predetermined maximum rate, said detector comprising:

means for establishing and storing a maximum cooling rate of suction conduit means temperature change, means for periodically measuring the temperature of said suction conduit means, means for determining a cooling temperature rate of change of said suction conduit means from at least two of the periodic measurements, and means for stopping the compressor on the determination of a cooling temperature rate of change of the suction conduit means in excess of the predetermined maximum cooling temperature rate of change of said suction conduit means.

24. A floodback detector as recited in claim 23 further providing, means for automatically restarting the compressor comprising:

first timer means having a first reset period, said first timer means being arranged to start timing on the occurrence of the alarm event when the compressor stops and to restart the compressor on elapse of the first reset period.

25. A floodback detector as recited in claim 24, further providing:

second timer means having a second reset period and further providing a manual restart mode and means for stopping the compressor in the manual restart mode on the condition of recurrence of the compressor stoppage before the end of the reset period of the second timer means.

26. A floodback detector as recited in claim 25 further providing counter means for counting the number of compressor stoppages, and means for stopping the compressor in the manual restart mode on the condition of more than two compressor stoppages occurring before the end of the reset period of the second timer means.

\* \* \* \* \*